…

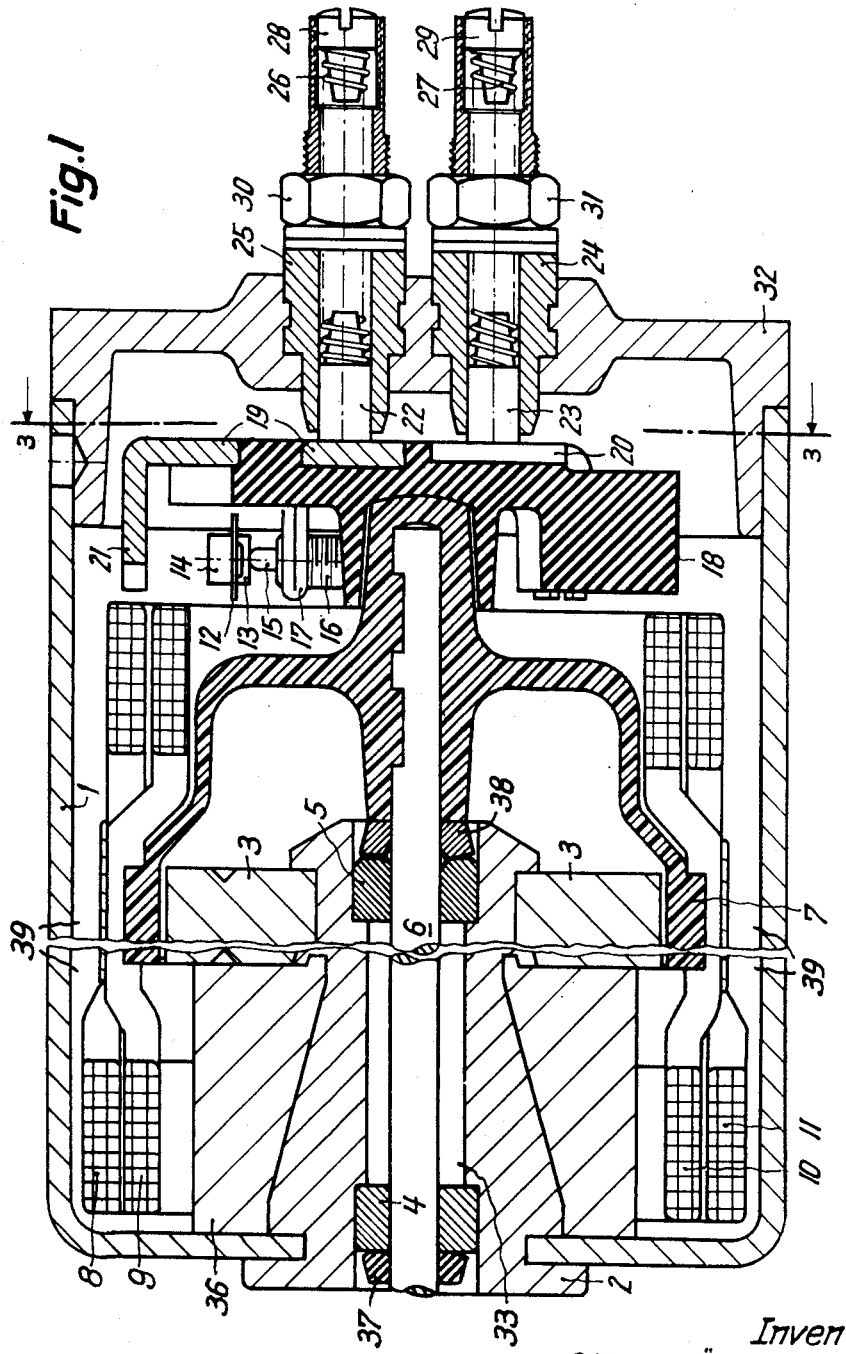

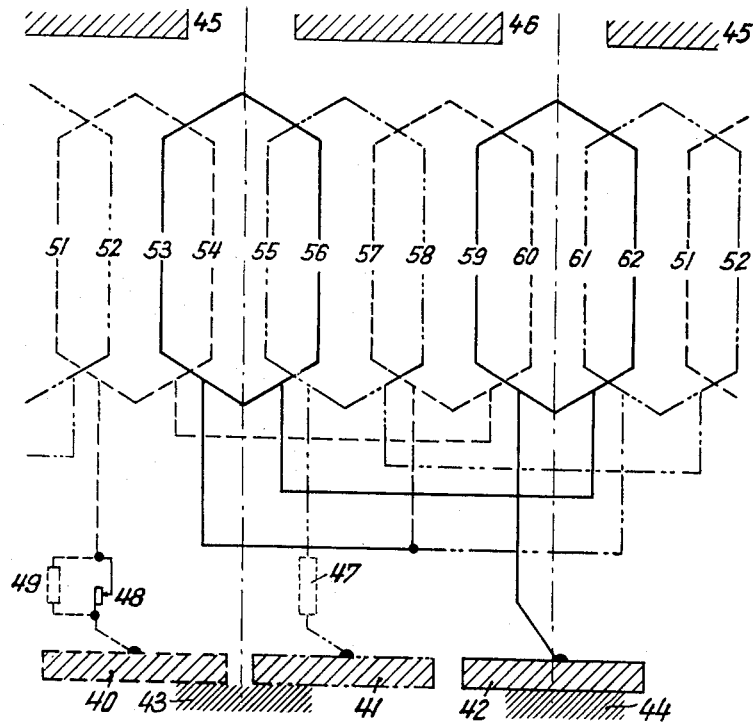
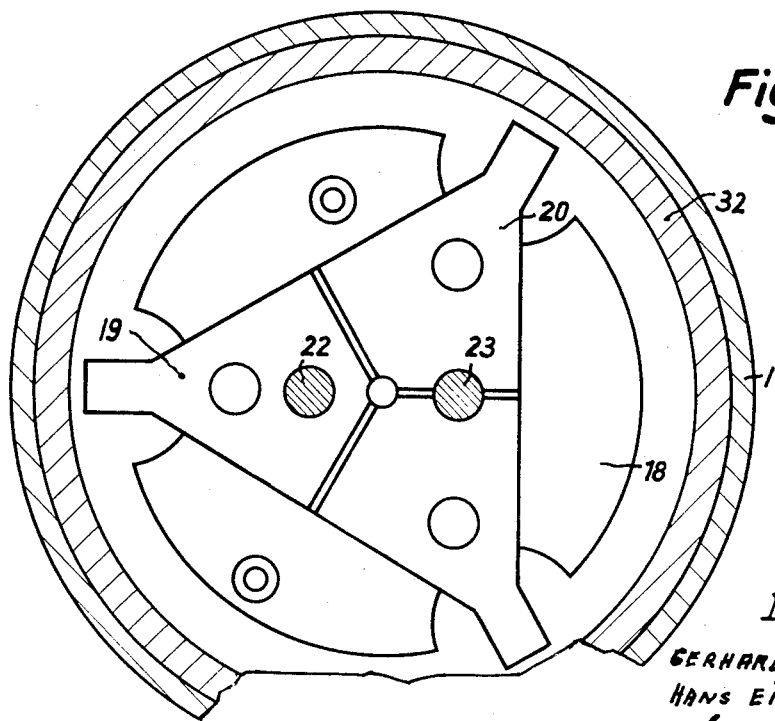

United States Patent Office 2,952,788
Patented Sept. 13, 1960

2,952,788
SMALL ELECTRIC MOTOR

Gerhard Völkerling, Berlin-Waidmannslust, and Hans Eisler, Berlin-Wilmersdorf, Germany, assignors to Licentia Patent-Verwaltung's-G.m.b.H., Hamburg, Germany Filed Apr. 1, 1958, Ser. No. 725,684

Claims priority, application Germany Apr. 5, 1957

17 Claims. (Cl. 310—266)

The present invention relates to electric motors and, more particularly, to electric motors having rotor structures which surround internal stator field structures.

It is an object of the present invention to provide new and improved motor structures.

It is another object of the invention to provide electric motors of high efficiency and long reliable lives for use as servomotors and for instrumentation purposes.

It is a further object of this invention to provide new and improved electric motors which have good speed regulation over limited speed ranges for widely fluctuating voltages of the power source and which are readily reversible in direction of rotation.

It is a still further object of the present invention to provide novel structures for electric motors of small size. Such novel structures improve the reliability of operation, the speed regulation characteristics and the sensitivity to control of small motors.

In carrying out this invention, a motor is constructed with a permanent magnet mounted on an internal stator which is surrounded by a bell-shaped rotor. The permanent magnet establishes an unvarying magnetic field flux which is perpendicular to the axis of rotation of the rotor. One end of the stator is connected to one end of the housing to provide a magnetic circuit having an annular air gap between the housing and the stator. Within this air gap, the bell-shaped rotor supports its armature windings. The stator is mounted on a tubular member through which the rotor shaft passes. The tubular member is formed of non-magnetic material, i.e., a material having a permeability substantially of unity. This member is suitably made by die-casting and houses bearings in which the rotor shaft freely rotates. The bell-shaped rotor is supported at its closed end upon its rotor shaft and carries the armature windings at its open end. Also mounted upon the rotor are a commutator and a centrifugal switch whose functions will become more apparent below. The commutator is disposed on one end of the rotor in a plane perpendicular to the axis of rotation so that brushes may be rotatably mounted about the axis of the rotor. The rotor coils are preferably flat and rectangular in shape and are mounted on the outer periphery of the open of the rotor which is in the air gap. The centrifugal switch is connected to at least some of the rotor coils to provide a built-in speed regulating device by switching in or out of the armature circuit either rotor coils or resistors to control the flow of armature current.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Figure 1 illustrates in section a motor constructed in accordance with the principles of this invention;

Figure 2 is a schematic showing of the rotor windings, commutator, and centrifugal switch of the motor of Figure 1; and Figure 3 is a cross sectional view of one end of the motor taken along the line 3—3 of Fig. 1.

Referring in more detail to the drawing and particularly to Figure 1, the reference character 2 designates a tubular member of non-magnetic material, die-cast for example, supporting permanent magnet field poles 3 in a fixed position. A magnetically conductive member 36 magnetically connects the field poles 3 with a portion of the housing 1 to form a magnetic circuit from the poles 3 through the member 36, the housing 1 and an annular air gap 39 between the housing 1 and the field poles 3. Bearings 4 and 5, mounted within the hollow portion of the tubular core 2, rotatably support a rotor shaft 6 connected at one end to the closed end of a bell-shaped rotor 7. The body of the rotor 7 is made of moldable material, for example a synthetic resin, and supports armature windings 8, 9, 10 and 11 on its outer periphery in the air gap 39. The rotor windings 8, 9, 10 and 11 are composed of six coils which are arranged in two layers on the rotor 7, each coil being generally rectangular in shape. The armature windings may be attached to the rotor 7 in any convenient manner, such as by glueing, cementing or with a suitable tape.

Also mounted on the rotor 7 at its closed end is a centrifugal switch comprising a leaf spring 12 which carries a weight 14 and a contact 13 at one end and which is attached to the rotor 7 at the other end. When the switch is closed, the contact 13 completes a circuit with a stationary contact 15 mounted on a screw 16 which is locked in any desired position by a locking member 17. As the rotor 7 reaches a preselected speed, a centrifugal force acting upon the weight 14 causes the contact 13 to move away from the fixed contact 15 against the action of the spring 12. The screw member 16 may be used to regulate the position of the contact 15 with respect to the contact 13 and, thus, determines the bias applied by the spring 12 to select the speed at which the switch opens. The locking member 17 is mounted upon an insulating disc 18 which also supports commutator bars 19 and 20.

Although only two are shown in Figure 1, three commutator bars 19, 20 and 35 are mounted in a common plane on the insulating disc 18. Each of the commutator bars is shaped as a segment of a circle (not shown). The commutator bars each have a leg bent at 90° to the common plane of the commutator, for example, leg 21 of the bar 19 for connecting the appropriate armature coils to the respective commutator bars. No such connections are illustrated in Figure 1 to avoid unduly complicating the drawing, but the connections are illustrated in Figure 2. Brushes 22 and 23 make sliding contact with the commutator bars 19, 20 and 35 in sequence as the rotor 7 turns on its axis. Tubular supports 24 and 25 surround the brushes 22 and 23, and spring members 26 and 27, backed by adjustment screws 28 and 29, urge the brushes into contact with the commutator. Electrical energy is supplied to the motor through wires which may be connected to the brushes 22 and 23 by means of terminal nuts 30 and 31. The entire brush assembly is supported in an end plate 32 for the housing 1, which end plate 32 may be formed from a transparent material to allow for periodic inspection of the commutator and brushes. The housing 1 is generally cylindrical in shape and the end plate 32 is mounted thereon for rotatable adjustment of the brushes 22 and 23 with respect to the commutator.

Within the tubular core 2, the space 33 between bearings 3 and 5 may contain a suitable lubricant for maintaining the bearings in good operating condition. The bearing 5, in addition to supporting the shaft 6, also serves as a thrust bearing, exerting force against a stop member 38 mounted on the shaft 6 adjacent the closed end of the rotor 7. A similar stop 37 adjacent bearing 4 prevents end play of the shaft 6. In place of the permanent magnet 3, an electromagnet may be provided. The permanent magnet 3 may be formed of one of the recently developed high coercive force ceramic materials, some of which contain barium-iron-oxide. The magnet 3 should establish a sufficiently high radial flux density in the air gap 39 so that the amount of copper in the rotor coils may be kept to a minimum.

The circuit diagram of the rotor windings in Figure 2 shows their connection to the commutator segments and to the centrifugal switch. While the rotor windings illustrated in Figure 2 are star connected, it is within this invention to connect the windings in delta or any other desirable manner. The commutator segments in Figure 2 are designated by 40, 41 and 42 and are shown being contacted by brushes 43 and 44. Although such connection is not illustrated in Figure 2, it is to be understood that the brushes 43 and 44 are arranged with suitable terminals to be connected to a source of electrical power. The shaded blocks at the top of the figure are illustrative of the magnetic pattern established by the coils of the rotor, the block 45 representing one polarity and the block 46 representing the opposite polarity. The individual coils of the rotor windings are diagrammatically illustrated as single loops, the sides of each loop being sequentially designated 51 to 62. The loops represented as 51 to 54 and 52 to 61 are shown cut and in overlapping relation at both sides of the drawing to ensure that the complete winding is shown. The coils 51 to 54 is connected at side 51 to one side of a centrifugal switch 48, which corresponds to the switch illustrated in Figure 1, the other side of which is connected to the commutator segment 40, corresponding to commutator segment 19 of Figure 1. A resistor 49 may be connected in parallel with the switch 48 to be inserted in series between the coil side 51 and the commutator segment 40 when the switch 48 opens. If the resistor is not included in the circuit, then the coils 51 to 54 and 57 to 60 are removed from the circuit when the switch 48 opens.

The coils illustrated in Figure 2 are shown in three separate groups, one group including coils 51 to 54 and 57 to 60, being shown in dashed lines, a second group including coils 53 to 56 and 59 to 62 being shown in solid lines, and a third group including coils 55 to 58 and 61 to 52 being shown as staggered lines.

In the position of the rotor shown in Figure 2, the brush 43 contacts both the commutator segment 40 and the segment 41. Thus, all six of the coils are energized to additively generate the magnetic field flux represented by the blocks 45 and 46. A resistor 47 may be included in the circuit from a commutator segment, for example 41, to the appropriate coil to limit the flow of current in the windings, and to, thus, enable the motor to be operated on a voltage higher than that for which it was originally designed. By the use of resisors, such as 47, the motor may be adapted for use in many different systems. In this manner, a much more versatile device is produced by a very simple expedient. The combination of the resistor 49 and the switch 48 provides an efficient means for regulating the speed range of the motor in spite of variations in supply voltages. As the speed of rotation of the rotor 7 increases, it reaches a preselected point at which the switch 48 opens. The resistor 49 is then placed in series with the coils 51 to 54 and 57 to 60, increasing the resistance of the circuit and decreasing the flow of current therethrough. As the current flow through the armature windings drops, the speed also falls until the point is reached at which the switch 48 closes. When the switch 48 closes, the resistor 49 is short-circuited and the flow of current in the armature windings increases to correspondingly increase the rotational speed of the rotor 7. In this manner, the speed of the rotor may be maintained within two limits determined by the setting of the screw 16 and the size of the resistor 49. If no resistor 49 is used, the operation of the switch 48 serves to include or remove the coils 51 to 54 and 57 to 60 from the circuit. Alternatively, the coils 51 to 54 and 57 to 60, or either one, may be made of high resistance wire, and the total resistance in the circuit may be varied by the presence or absence of these coils. Also, a centrifugal switch, such as 48, may be included in other portions of the circuits, such as between two coils to add or remove a coil, part of a coil, or a damping circuit, to control the speed of the motor.

This specification has described a new and improved electric motor which has a permanent magnet field structure located within a bell-shaped air-core rotor to provide a motor having a long and reliable life with high operating efficiency and responsive to external control. It is clear that this description will suggest to those skilled in the art other forms and arrangements within the principles of this invention and it is, therefore, intended that this invention be limited only by the scope of the appended claims.

We claim:

1. An electric motor comprising a stator with a housing having an opening at one of its front ends, a magnetically conductive member supported by and extending into said housing adjacent said opening, stator pole means on the free ends of said magnetically conductive member mounted inside said housing, whereby an annular air gap is provided between said magnetically conductive member with said stator pole means mounted thereon and the inner wall surface of said housing, a tubular member having a permeability substantially of unity secured to said housing at said opening and extending into said housing, a bell-shaped rotor adjacent the inner end of said tubular member and being formed of nonmagnetic material having a rim surrounding said stator pole means in said annular gap, coils supported by said rotor in said air gap, means to connect said coils to an outside source of electric energy, shaft means passing through said tubular member and terminating in said rotor, said shaft means adapted to rotatably support said rotor, and at least two bearings inside said tubular member to rotatably mount said shaft.

2. An electric motor comprising a housing, a stator, a member connecting portions of said stator with portions of said housing to provide a magnetic circuit having an annular air gap, magnetically active means within said housing for establishing a magnetic flux across said air gap, a tubular member of non-ferro-magnetic material connected to said housing and terminating therein and supporting said stator, a cup-shaped rotor of nonmagnetic material partially surrounding said means and said tubular member and extending into said air gap, electric coils supported by said rotor in said air gap, a rotatable shaft within said tubular member extending through one side of said housing and carrying said rotor and terminating therein adjacent the inner end of said tubular member, a commutator mounted on said rotor and connected to said coils, and means connecting said commutator to a D.C. source of electrical energy.

3. The motor defined in claim 2 wherein said means for connecting said commutator to a source of electrical energy includes conductive brushes positioned in said housing to face said commutator.

4. The motor defined in claim 2 further including a nonconductive disc-like member mounted on said rotor at the inner end of said rotor shaft and bearing said commutator thereon, and further including a control device mounted on said disc-like member and electrically connected to said electric coils.

5. The motor defined in claim 2 wherein said coils are generally rectangular in form and are arranged in said air gap in two layers.

6. The motor defined in claim 4 wherein said control device comprises a centrifugal switch having a leaf spring, a first contact mounted at one end of said spring, the other end of said spring being attached to said disc-like member, and a second contact mounted on said disc-like member and adapted to be touched by said first contact when the switch is closed, said switch opening when said rotor reaches a preselected rotational speed.

7. The motor defined in claim 4 wherein said commutator comprises a plurality of commutator segments and wherein said control device comprises a centrifugal switch, said switch being connected between one of said segments and one of said electrical coils.

8. The motor defined in claim 4 wherein said control device comprises a centrifugal switch, said switch being adapted to periodically disconnect at least part of said electrical coils to provide damping means for said rotor.

9. The motor defined in claim 4 further including a resistor connected in parallel with said centrifugal switch whereby said resistor is inserted in the circuit when said switch opens.

10. The motor defined in claim 4 wherein one of said coils comprises a high resistance winding and wherein said centrifugal switch connects said winding in series with the remainder of the coils when it opens.

11. The motor defined in claim 4 wherein said centrifugal switch includes adjustable means to select the rotational speed at which it becomes operative.

12. The motor defined in claim 5 further including tape means to support said coils upon said rotor.

13. The motor defined in claim 5 further including adhesive means between said coils and said rotor for retaining said coils upon said rotor.

14. The motor defined in claim 3 further including tubular support members positioned in an end plate of said housing for supporting the brushes therein, spring members within said tubular members bearing against said brushes to urge them into contact with said commutator, and adjustable backing pieces for said spring members, the center lines through said brushes being parallel to said rotor shaft and the surface of said commutator slidingly engaged by said brushes being perpendicular to said center lines.

15. The motor defined in claim 13 wherein said end plate comprises a transparent member through which said brushes and commutator may be visible, said end plate being rotatably adjustable about the axis of rotation of said rotor.

16. The motor defined in claim 1 wherein said means for causing magnetic flux to traverse that air gap comprises a permanent magnet field structure.

17. The motor defined in claim 1 wherein said means for causing magnetic flux to traverse the air gap comprises an electromagnet.

References Cited in the file of this patent

UNITED STATES PATENTS

| | | |
|---|---|---|
| 1,075,987 | McMahon | Oct. 14, 1913 |
| 2,833,879 | Naul | May 6, 1958 |

FOREIGN PATENTS

| | | |
|---|---|---|
| 315,712 | Switzerland | Oct. 15, 1956 |
| 490,046 | Italy | Jan. 30, 1954 |
| 683,081 | Germany | Oct. 28, 1939 |

OTHER REFERENCES

International Dictionary of Physics and Electronics, Van Nostrand, page 230.